June 12, 1951 W. A. MARKKULA 2,556,592
TRACTOR BARN CLEANER FOR GUTTERLESS BARNS
Filed May 23, 1949 2 Sheets-Sheet 2
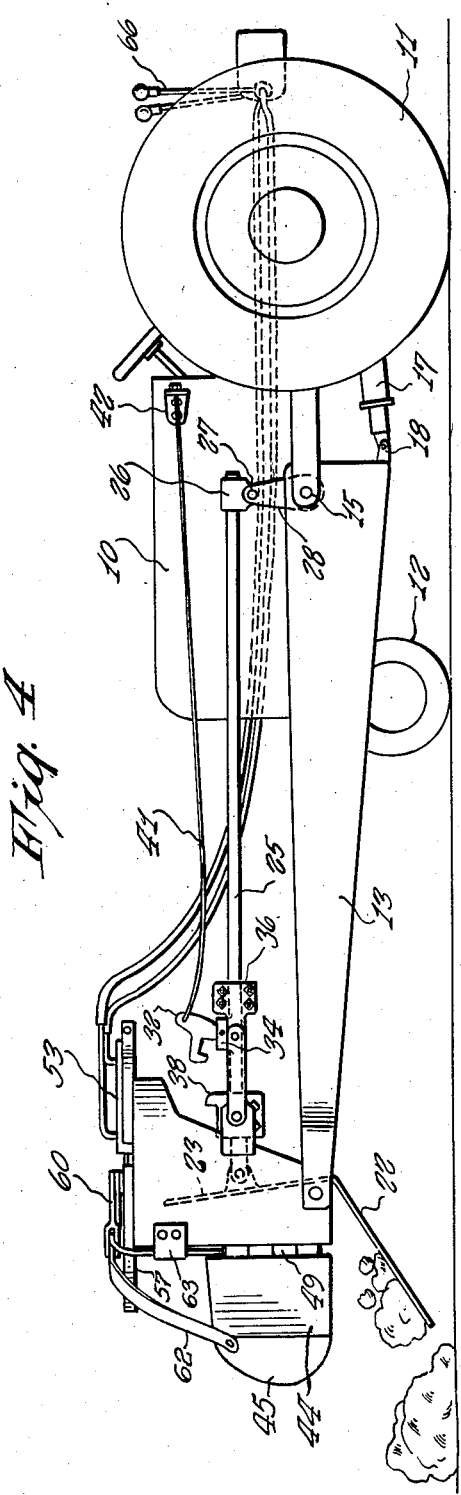
INVENTOR.
WILLIAM A. MARKKULA
BY J. Ledermann
ATTORNEY

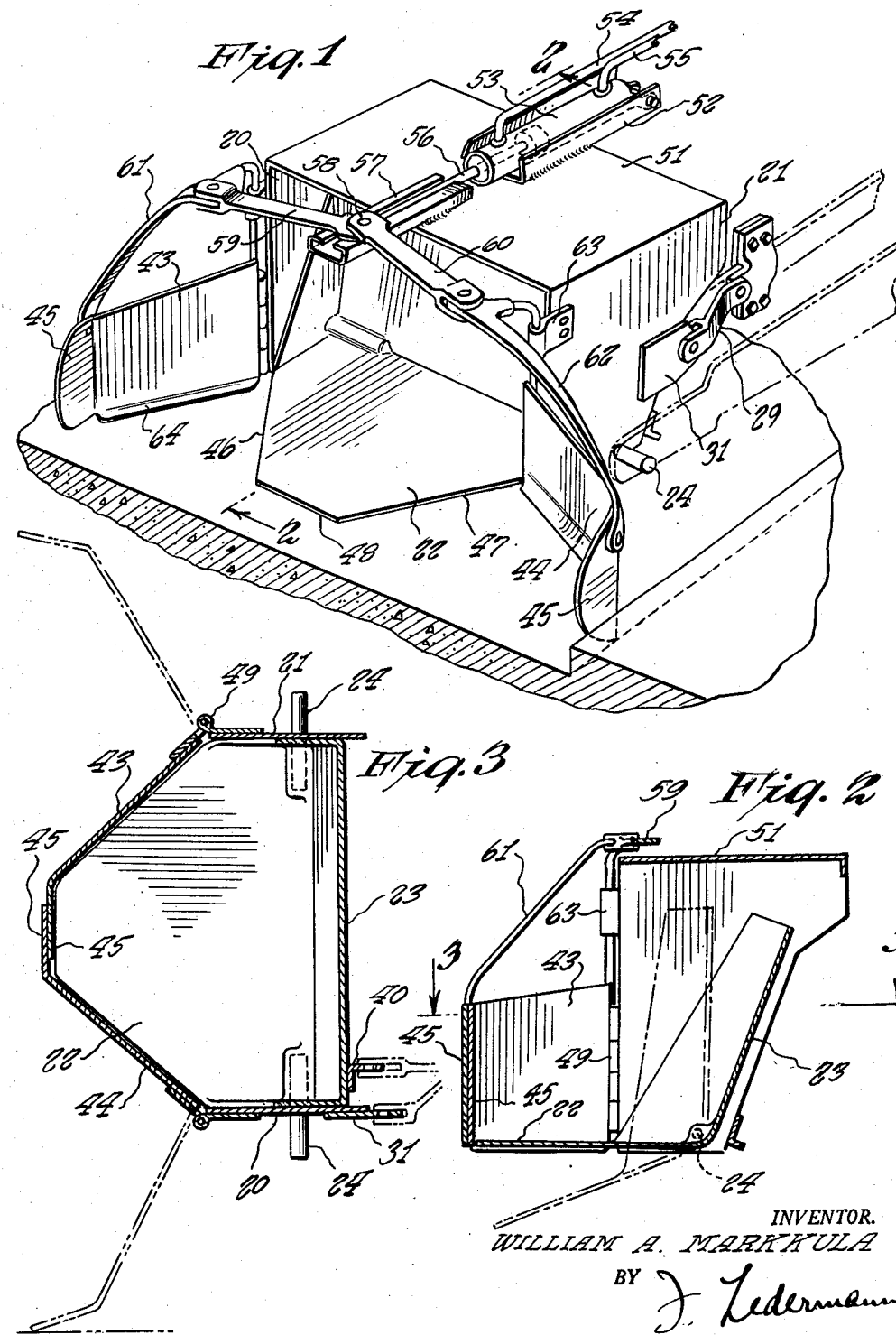

Patented June 12, 1951

2,556,592

UNITED STATES PATENT OFFICE 2,556,592

TRACTOR BARN CLEANER FOR GUTTERLESS BARNS

William A. Markkula, Menahga, Minn.

Application May 23, 1949, Serial No. 94,854

6 Claims. (Cl. 214—140)

This invention relates to a tractor barn cleaner for gutterless barns.

It is an object of the present invention to provide a barn cleaner adapted to be connected to a tractor and to be controlled from the operator's station thereof to effect the opening and closing of side wings of the scraping element and wherein these sides can be brought to an angle position in front of the scraper element to confine the collected contents therein and wherein upon release of the bottom of the element, the contents can be dropped from the element to a wagon for the purpose of transport and wherein the arm on which the scraper element is located is adjustable to different elevated positions to and from the scraping position.

Other objects of the present invention are to provide a barn cleaning device which is adapted to be mounted upon a tractor in a direct connected manner which is of simple construction, inexpensive to manufacture, easy to assemble upon the tractor, has a minimum number of parts, compact, easy to operate and control, and efficient in operation.

For other objects and for a better understanding of the invention, reference may be had to the following detailed description taken in connection with the accompanying drawing, in which Fig. 1 is a perspective view of the scraping element with the wing parts in their open position and the scraping element adapted to receive the manure as it is pushed along the barn floor.

Fig. 2 is a longitudinal sectional view taken generally on line 2—2 of Fig. 1.

Fig. 3 is a transverse sectional view taken generally on line 3—3 of Fig. 2.

Fig. 4 is a side elevational view of the barn cleaning device and of a tractor with the device elevated from the tractor and the scraping element discharging the material.

Fig. 5 is an enlarged fragmentary perspective view looking upon the rear of the scraping element and upon the trip mechanism.

Referring now to the figures, 10 represents a tractor having rear wheels 11 and a forward wheel support 12. This tractor is of the tricycle type. Lifting arms 13 and 14 are pivoted to the side of the tractor, as indicated at 15, and are fixed together forwardly of the tractor by cross pieces 16, Fig. 5. A power cylinder 17 is connected between the tractor and the lower end of the arm 13, as indicated at 18, and when extended will cause the lifting arms to be elevated at their forward ends and about the pivot point 15 of the tractor.

On the outer ends of the arms 13 and 14 there is pivoted a scraping element structure, indicated generally at 19. This structure has two sides 20 and 21 which are fixed to the ends of the arms and between which extends a drop bottom 22 with an upstanding back wall 23. This drop bottom has trunnions 24 which extend through the side plates 20 and 21 and the arms 13 and 14.

In order to keep the scraping element arrangement 19 properly positioned with the movement of the supporting arms 13 and 14, there is extended longitudinally a rod 25 having a fitting 26 on its rear end. This fitting 26 is pivotally connected, as indicated at 27 to an upstanding arm 28 which is carried on the rear end of the arm 29 to pivot therewith. The forward end of the rod 25 is anchored through a fitting 29 to a lug 31 on the side plate 21, Fig. 5.

This rod 25 carries a trip element 32 which is pivoted at 33 between upstanding plate portions 34, and fixed upon the rod 25 against displacement by clamping plates 35 and 36 having clamping nuts 37. This trip lever engages with a shoulder member 38 adjustable on the end of the rod and which is connected through a tubing 39 with an integral fitting 40 on the drop bottom upstanding portion 23.

The lever 32 has a rope 41 connected to it and to a bracket 42 on the tractor near the operator's station. As this lever is pulled, the weight of the material will cause the bottom 22 to drop, the same having been released from the shoulder 38.

Hinged at the opposite sides of the scraping element are wings 43 and 44 which are bent inwardly at their outer ends, as indicated at 45. The bottom 22 has inclined side edges 46 and 47 against which the respective wings 43 and 44 are brought upon the same being closed upon the bottom. The inwardly bent ends 45 will be brought against the forward transverse edge 48 of the scraper bottom 22 in an overlapping manner, as shown in Fig. 3. The hinges for the wings 43 and 44 are indicated at 49 and are fixed respectively to the sides 20 and 21 of the scraping element.

Extending across the top of the scraping element is a top portion 51 which is integral with the sides 20 and 21. Mounted on this top portion is a channel piece 52 in which is disposed a fluid actuating device 53 of the double acting type and supplied with oil under pressure through pipe lines 54 and 55 and which has an actuating rod 56 operable in a guide 57 fixed to the top portion 51 and projecting forwardly of the front edge thereof. The rod 56 is connected through a pin 58 to links 59 and 60 which are respectively connected to upstanding projections 61 and 62 on the respective wing gate members 43 and 44. These projections 61 and 62 have connections respectively with hinge elements 63. The wing members 43 and 44 are turned inwardly at their bottom edges as indicated at 64 to underlie the edges 46 and 47 of the drop bottom 22.

When the arms 13 and 14 are lowered, the scraper bottom 22 will lie flush upon the barn floor and with the wing members 43 and 44 in their open position, a large quantity of the manure will be gathered and extended into the arrangement as the tractor is moved forwardly. When a sufficient amount has been gathered, control lever 66 at the rear of the tractor, Fig. 4, will be operated to cause the actuating member 56 of the fluid actuator 53 to be drawn inwardly along with the links 59 and 60 and the wing members 43 and 44 will be caused to close upon the inclined side edges 46 and 47.

While various changes may be made in the detail construction, it will be understood that such changes shall be within the spirit and scope of the present invention as defined by the appended claims.

What is claimed is:

1. In combination a tractor having supporting wheels, forwardly extending vertically adjustable arms pivotally connected to the tractor and means for actuating said arms coupled with the tractor, a scraping arrangement having side portions pivotally connected to the arms, a top portion connected to the side portions, a drop bottom pivoted between the arms and extending forwardly of the side portions, means operable by the arms for pivoting the scraper arrangement to keep it level in various positions of adjustment of the arms, wing members hinged to the side portions and adapted to be drawn about the drop bottom portion whereby to maintain the material collected by the drop bottom, releasable means for retaining the drop bottom in its elevated position but upon disengagement from the drop bottom releasing the drop bottom to pivot downwardly and discharge the material, means operable from the tractor for opening and closing the wing members.

2. The combination as defined in claim 1 and said wing members having inwardly bent ends adapted to overlap with one another when brought together, said bottom portion having inclined scraping edges adapted to be engaged by the wing members when in their closed positions and a relatively short forward transverse edge adapted to be enclosed by the inwardly bent ends of the wing members.

3. The combination as defined in claim 1 and said wing members having inwardly bent ends adapted to overlap with one another when brought together, said bottom portion having inclined scraping edges adapted to be engaged by the wing members when in their closed positions and a relatively short forward transverse edge adapted to be enclosed by the inwardly bent ends of the wing members, said wing members having inwardly bent lower edges adapted to underlie the inclined scraping edges of the drop bottom.

4. The combination as defined in claim 1 and said means for keeping the scraping arrangement level comprising a rod extending parallel to the lifting arms, an arm fixed to the lifting arm to be adjusted therewith whereby to operate said rod, said rod at its forward end being connected to one of the side portions of the scraper arrangement to prevent tilting movement of the scraping arrangement as the lifting arms are operated.

5. The combination as defined in claim 1 and said means for keeping the scraping arrangement level comprising a rod extending parallel to the lifting arms, an arm fixed to the lifting arm to be adjusted therewith whereby to operate said rod, said rod at its forward end being connected to one of the side portions of the scraper arrangement to prevent tilting movement of the scraping arrangement as the lifting arms are operated, and said releasable means being associated with said rod and including a trip lever and a shoulder portion slidable upon said rod whereby, when said shoulder portion is released from said trip lever, the drop bottom will be released to pivot downwardly and discharge the material.

6. The combination as defined in claim 1 and said means for operating said wing members comprising a fluid actuator having an actuating member, upstanding portions on said wing members, pivot links connecting said upstanding portions of the wing members with the actuating member, said fluid actuator being fixed to the top portion of the scraping arrangement.

WM. A. MARKKULA.

REFERENCES CITED

The following references are of record in the file of this patent:

UNITED STATES PATENTS

| Number | Name | Date |
| --- | --- | --- |
| 2,409,302 | Millikin | Oct. 15, 1946 |
| 2,457,049 | Lacey | Dec. 21, 1948 |
| 2,511,439 | Lacey | June 13, 1950 |